UNITED STATES PATENT OFFICE.

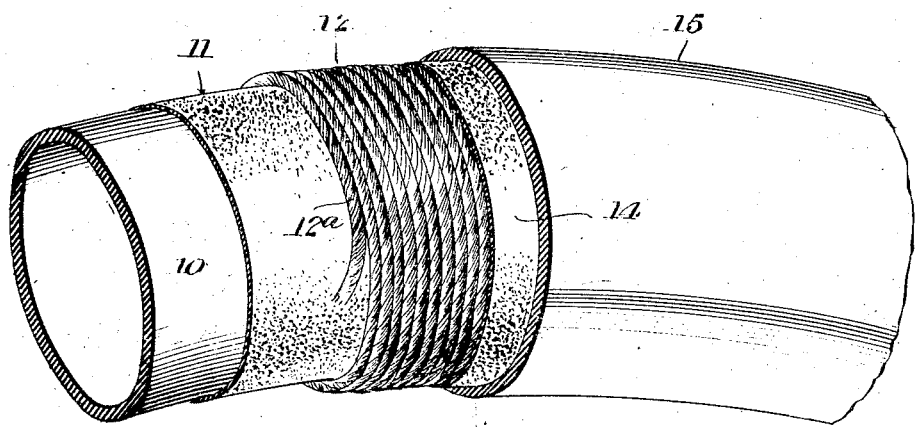
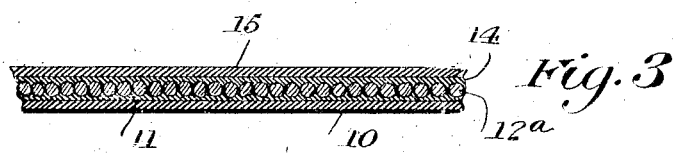
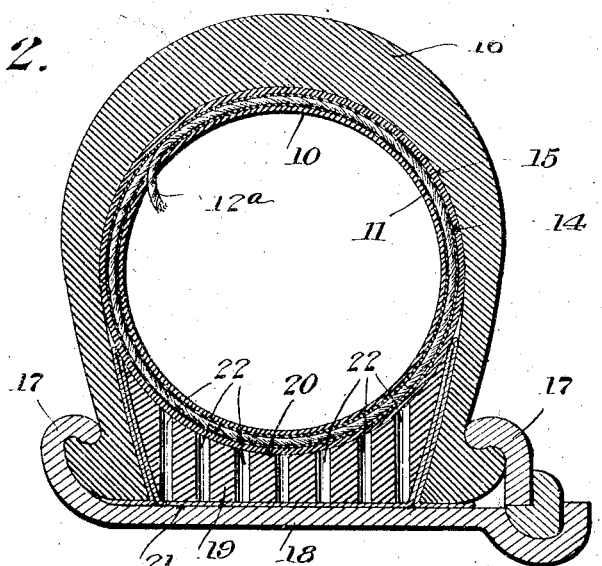

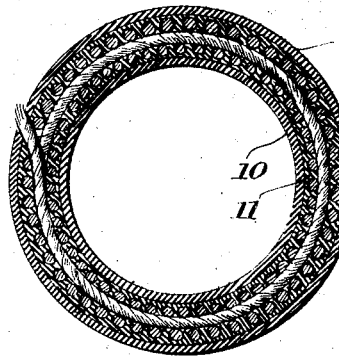
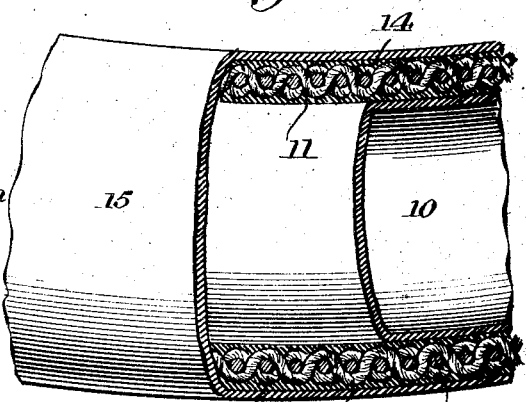
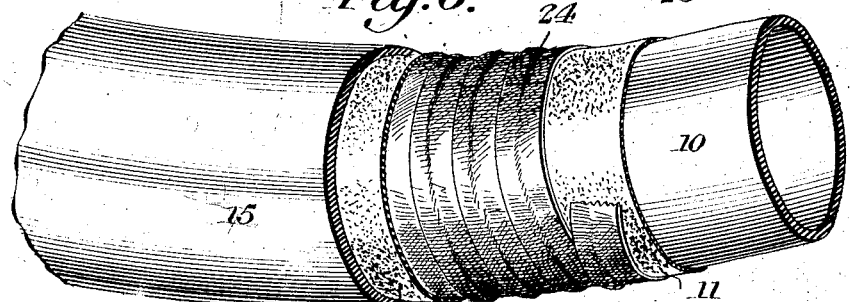
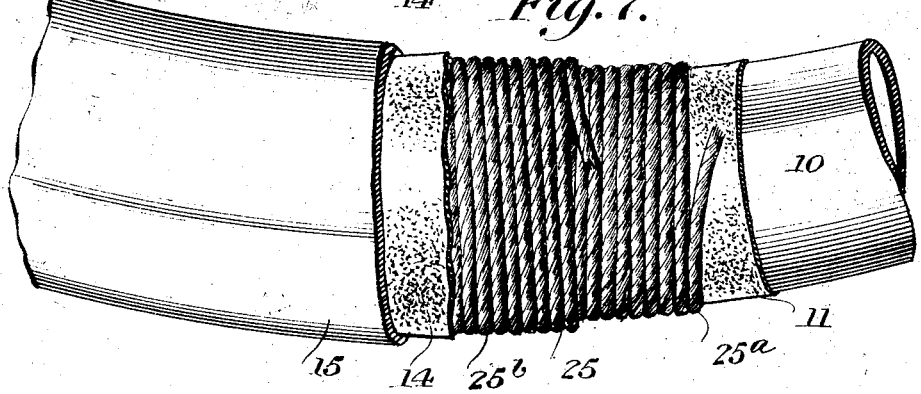

NORMAN R. LANDIS, OF PORTLAND, OREGON.

VEHICLE-TIRE.

1,156,155.  Specification of Letters Patent.  Patented Oct. 12, 1915.

Application filed March 5, 1914. Serial No. 822,854.

*To all whom it may concern:*

Be it known that I, NORMAN R. LANDIS, a citizen of the United States, residing at Portland, in the county of Multnomah and State of Oregon, have invented new and useful Improvements in Vehicle-Tires, of which the following is a specification.

The invention relates to vehicle-tires, and more particularly to those tires for use on vehicles such as automobiles, and has for an object to provide a vehicle tire of the pneumatic type, which will minimize the danger of punctures and blow-outs, and also increase the strength and durability of the usual outer shoe generally employed in connection with tires of a pneumatic nature.

The invention further comprehends the provision of a vehicle tire which will efficiently cushion the vehicle it is adapted to support, and which includes an inner non-expansible tube, suitably reinforced between its face and the outer shoe, so that the said outer shoe will not be weakened when air is injected into the inner tube, it being well known that in a large number of tires, now in use, the inflation of the inner tube results in an expansion of the outer shoe to an extent which materially weakens the shoe, thus exposing it to the cutting and puncturing action of any material or substance on the highway over which the tire is advanced, whereas if the outer shoe is not weakened in any manner, the molecules of rubber or other material, forming the shoe, will be held closely together and thus present a surface which will be less capable of being cut or otherwise punctured.

A still further embodiment of the invention resides in a tire in which the mentioned reinforcing, interposed between the inner tube and outer shoe, is so arranged that it will tend to deviate the pointed end of an article, which has penetrated the shoe, to an extent sufficient to prevent the penetration of the inner tube by the article, and wherein furthermore, if the said article should penetrate the inner tube, a sealing fluid carried within the inner shoe, will immediately plug the opening made by penetration and prevent the escape of air from the tube.

In the further disclosure of the invention, reference is to be had to the accompanying drawings, forming a part of this specification, in which similar characters of reference denote corresponding parts in all the views, and in which, Figure 1 is a fragmentary perspective view of my vehicle tire, having the outer shoe removed therefrom to show the construction of the tube; Fig. 2 is an enlarged vertical sectional view of the complete tire; Fig. 3 is a fragmentary horizontal sectional view, showing the manner of constructing the body of the tire; Fig. 4 is a fragmentary vertical sectional view of a modified form of tire; part of the tire being shown in side elevation; Fig. 5 is a vertical transverse sectional view of the form of tire shown in Fig. 4; Fig. 6 is a fragmentary perspective view of still another modified form of my tire; and Fig. 7 is a fragmentary perspective view of still another modified form of my tire.

Referring to the views, and more particularly to Figs. 1, 2, and 3, I employ an inner tube 10, preferably of rubber, and which is adapted to be suitably inflated with air, with the peripheral surface of the said tube coated with a rubber-like mucilaginous substance, spread over the surface of the tube evenly to form a continuous layer, this coating of adhesive being designated by the numeral 11, and clearly shown in Fig. 1. It will, of course be understood that the mucilaginous substance is preferably of a gummy nature in order that it will effectively fill the pores of the inner tube 10, when applied thereto as mentioned. A wrapping 12 is now arranged to encircle the tube 10, and may consist of a cord 12$^a$, as shown in Figs. 1, 2, and 3, this cord being wound around the tube so that the convolutions will fit closely together as indicated, the said cord being also adapted to be partially embedded in the layer 11 of mucilaginous substance, so that the cord will rigidly adhere to the face or outer surface of the tube 10, and thus be prevented from creeping along the tube. The wrapping 12 is also coated with a layer 14 of a mucilaginous substance, of the same nature as the heretofore mentioned layer or coating, on the surface of the tube 10, the said layer 14 being slightly thicker in order that the gummy and likewise adhesive cement constituting the layer will fill the interstices or grooves formed between adjacent convolutions of the cord 12$^a$, wound upon the tube 10 as stated, thus forming a smooth and sticky surface with the wrapping interposed between the layers 11 and 14 of the mentioned substance.

A covering 15, preferably of rubber, encircles the layer 14, and as will be readily understood, will rigidly adhere thereto, thus binding the covering to the wrapping 12. The covering is in turn partially encircled by a shoe 16, of the usual type, and which includes opposed integral clencher flanges 17, having connection with a clencher rim 18. It will now be apparent that the body of the tire, consisting of the mentioned tube 10, the wrapping 12, covering 15, and the layers 11 and 14, binding the wrapping to the tube and the covering to the wrapping, will be substantially inclosed in the shoe 16, and that the wrapping will not only prevent any undue bulging of the tube, when the same is inflated, but will also act as a protector for the tube to prevent the same from being punctured, while the provision of the layer 11 of gummy cement will rigidly bind the wrapping and tube together, the layer 14 of gummy cement being provided to fill the interstices between adjacent convolutions of the cord 12ª and bind the covering 15 to the wrapping, as stated heretofore.

A cushion 19, preferably of a soft rubber, encircles the rim 18, as shown in Fig. 2, the said cushion being circular and interposed between the rim flanges 17. The cushion has a concave face 20, forming a seat for the body of the tire with the covering lying against the said concave surface in order that the cushion will perform its function, as will be hereinafter more fully explained. A sheeting 21 is provided and has doubled portions thereof lying along the sides of the cushion 19, with a medial portion of the sheeting interposed between the underside of the cushion and the inner face of the rim 18. The ends of the sheeting 21 engage the clencher flanges of the shoe 16 and lie between the said flanges and the rim. The sheeting 21, as provided, will prevent dust or dirt and other foreign matter from entering the shoe at its juncture with the rim 18, and will also efficiently protect the resilient cushion 19 from moisture, the said cushion being conveniently provided with a series of apertures 22, which will greatly increase the cushioning effect of the cushion.

In Figs. 4 and 5 I disclose a modified form of my tire, and in which instance I employ a wrapping 23, of a woven nature with the wrapping interposed between the tube 10 and the covering 15. The wrapping consists more particularly of warp threads 23ª and weft threads 23ᵇ, relatively interwoven as shown, thus forming a wrapping, which when interposed between the tube 10 and covering 15, with the layers 11 and 14 filling the interstices between the wrapping and tube and the wrapping and covering, respectively, will efficiently protect the inflated tube and hold the same against undue expansion when the same is inflated.

In Fig. 6 I disclose still another modified form of my tire, and wherein I employ still another form of wrapping. As shown the wrapping is designated by the numeral 24, and is of a tape or strip-like nature, the said wrapping being adapted to be wound onto the tube 10, with the covering 15 inclosing the wrapping and likewise the tube, in the same manner as the constructions described heretofore. The layers 11 and 14 of mucilaginous substance, are of course, employed in connection with the wrapping 24, to secure the same rigidly to the tube 10 and the covering 15, thus preventing the wrapping from becoming displaced or creeping along the tube 10.

Still another form of wrapping 25 is disclosed in Fig. 7, and in which it will be seen that the same consists of a cord 25ª, wound around the tube 10, in one direction, and a second cord 25ᵇ, wound around the cord 25ª in the opposite direction, the cord 25ª being held rigidly on the tube 10 by the layer of mucilaginous substance 11, described heretofore, and the cord 25ᵇ being held rigidly on the cord 25ª by tightly winding the same on the cord 25ª, with the layer of mucilaginous substance interposed between the cord 25ᵇ and the covering 15, thus filling the interstices between adjacent convolutions of the cord and rigidly binding the covering to the said cord.

I preferably inject a suitable tire or puncture sealing fluid into the tube 10, for the purpose of readily stopping what are commonly known as pin-hole punctures, although it will also aid in plugging punctures of considerable size on account of the provision of the wrapping, encircling the tube, and which, if penetrated, adjacent the point of penetration of the tube, will receive a quantity of the sealing fluid from the inner tube, with the said fluid adapted to flow through the wrapping, and which, preferably made of cloth, will tend to stop the exit of air, upon becoming saturated with the sealing fluid.

It will be understood that the modified forms of wrappings described and shown are adapted for use with the structure disclosed in Figs. 1 and 2, with any one of the said wrappings adapted to take the place of the particular form of wrapping used in connection with the structure, as shown, although I do not limit myself to the precise construction disclosed, but to the scope of the claims appended hereto.

From the foregoing description, taken in connection with the views, it will be apparent that I provide a tire, particularly adaptable for heavy work, as on automobiles, and in which the chances of meeting with a puncture are greatly reduced, by forming the tire with a non-expansible inner tube which will prevent any bulging of the shoe and which, coöperating with the wrapping mentioned, will prevent the outer shoe from weakening under the pressure of the air contained in the inner tube. Furthermore the provision of the fluid sealing means tends to plug a cut or gash made sufficiently deep to penetrate the inner tube and permit the escape of air therefrom. As stated heretofore the intermediate wrapping is secured both to the inner tube and outer shoe and therefore is not only bound to the tube and shoe but also acts as a means to bind the tube and shoe, thus preventing any creeping of the tube or wrapping relatively to the shoe.

It will of course be understood that the various component parts of the tire are suitably vulcanized so that the completed and finished tire will be a unitary structure in which the various coverings or mentioned layers of material will be relatively bound together by the vulcanizing process.

Having described my invention, what I claim is;

1. A tire comprising an inner non-expansible tube, a wrapping encircling the said tube, a layer of mucilaginous substance interposed between the tube and the said wrapping and binding the wrapping to the tube, a covering encircling the said wrapping, a layer of mucilaginous substance interposed between the covering and the wrapping, and binding the covering to the wrapping, and a shoe inclosing the said covering, said tube, wrapping and covering being relatively vulcanized.

2. A tire comprising an inner tube, a wrapping encircling the same, a covering encircling the wrapping, layers of mucilaginous substance, one of said layers lying between the tube and the wrapping and the other lying between the wrapping and the said covering, and a shoe partially inclosing the covering and secured thereto.

3. A tire comprising an inner tube, a wrapping encircling the same, a covering for the wrapping, means interposed between the tube and the said wrapping and the wrapping and the said covering, for securing the wrapping rigidly to the tube and the covering rigidly to the wrapping, and a shoe partially inclosing the said covering.

4. In a tire, an inner tube, a wrapping thereon, a covering for the wrapping, layers of mucilaginous substance, one of said layers lying between the tube and wrapping and the other between the wrapping and covering, said tube and wrapping and wrapping and covering being vulcanized to each other.

Signed at Hiawatha, in the county of Brown and State of Kansas, this 18 day of Sept., 1913.

NORMAN R. LANDIS.

Witnesses:
W. F. MEANS,
G. E. MITCHELL.